UNITED STATES PATENT OFFICE.

ALEXANDER ORR, OF GLASGOW, COUNTY OF LANARK, SCOTLAND.

PROCESS OF MAKING WHITE LEAD.

SPECIFICATION forming part of Letters Patent No. 428,017, dated May 13, 1890.

Application filed January 3, 1888. Serial No. 259,556. (No specimens.) Patented in England November 11, 1887, No. 15,406.

*To all whom it may concern:*

Be it known that I, ALEXANDER ORR, a subject of the Queen of Great Britain and Ireland, and a resident of Glasgow, county of Lanark, Scotland, have invented a new or Improved Process of Making White Lead, (for which I have obtained British Patent No. 15,406, dated November 11, 1887,) of which the following is a specification.

My said invention has for its object to improve and render more expeditious that process for making white lead in which the lead is exposed to the action of acetic acid and carbonic acid.

In carrying out my invention I take litharge or lead oxide in a finely-ground condition and mix it with about an equal weight of water in any suitable vessel, giving preference to a vessel which can be closed and will withstand an internal pressure of about five or six pounds more than that of the atmosphere. I add a small quantity of acetic acid and inject carbonic acid into the mixture, which is kept well stirred or agitated by any suitable mechanical appliance. When treated in this way, the litharge is converted into white lead in a much shorter time than in ordinary processes. A very small quantity of acetic acid is required, one pound or even less of acetic acid for every hundred pounds of litharge being sufficient.

I claim as my invention—

The process of producing white lead, which process consists in mixing litharge or lead oxide and water in about equal proportions with a small quantity of acetic acid, in about the proportion of one pound or less of acetic acid for every hundred pounds of lead oxide, injecting carbonic acid into the mixture, and at the same time agitating the latter, all substantially as described.

In testimony whereof I have signed my name to this specification in the presence of two subscribing witnesses.

ALEXANDER ORR.

Witnesses:
 EDMUND HUNT,
 DAVID FERGUSON.